June 17, 1952 A. A. BERNARD 2,600,728
SHAPE-CUTTING MACHINE OR THE LIKE
Filed Oct. 14, 1947 13 Sheets-Sheet 1
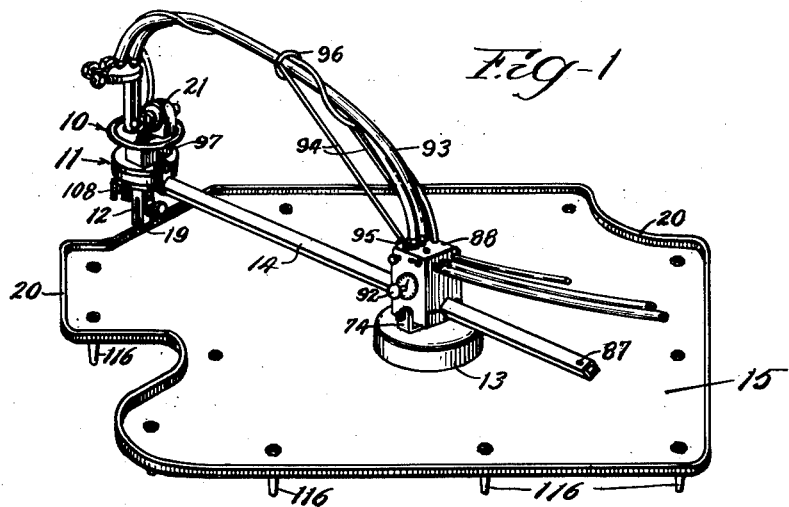
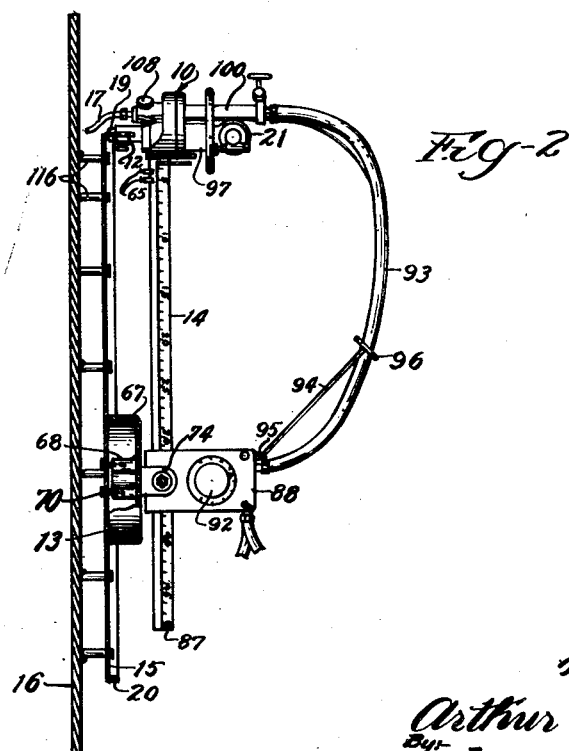
Inventor
Arthur A. Bernard
By Mann and Brown
Attys.

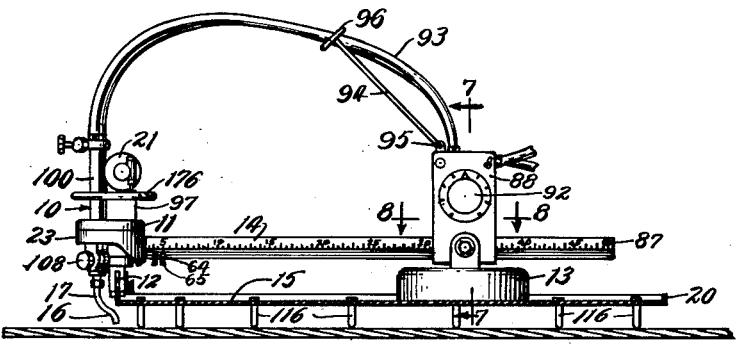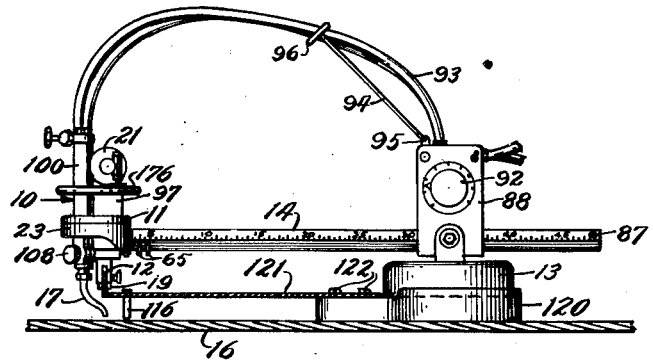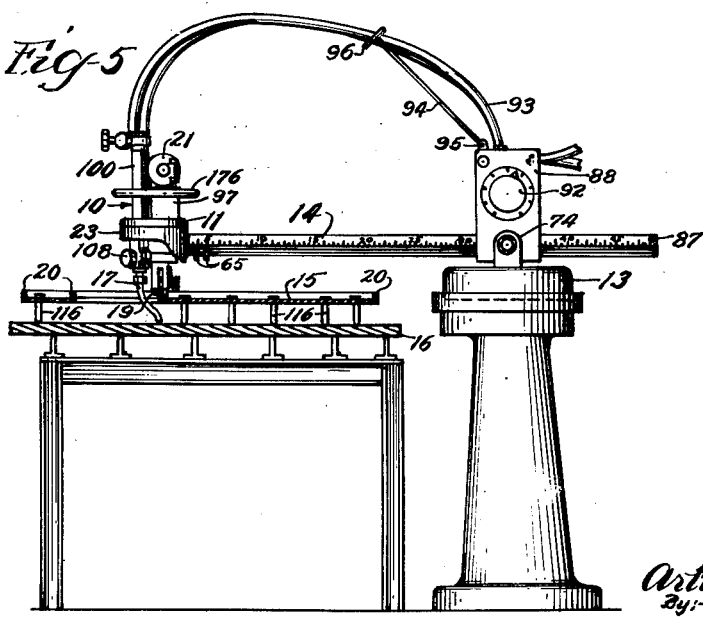

June 17, 1952     A. A. BERNARD     2,600,728
SHAPE-CUTTING MACHINE OR THE LIKE
Filed Oct. 14, 1947     13 Sheets-Sheet 3

Inventor
Arthur A. Bernard
By:- Mann and Brown
Attys

June 17, 1952  A. A. BERNARD  2,600,728
SHAPE-CUTTING MACHINE OR THE LIKE
Filed Oct. 14, 1947  13 Sheets—Sheet 4

June 17, 1952    A. A. BERNARD    2,600,728
SHAPE-CUTTING MACHINE OR THE LIKE
Filed Oct. 14, 1947    13 Sheets-Sheet 5

Inventor
Arthur A. Bernard
By:- Mann and Brown
Attys.

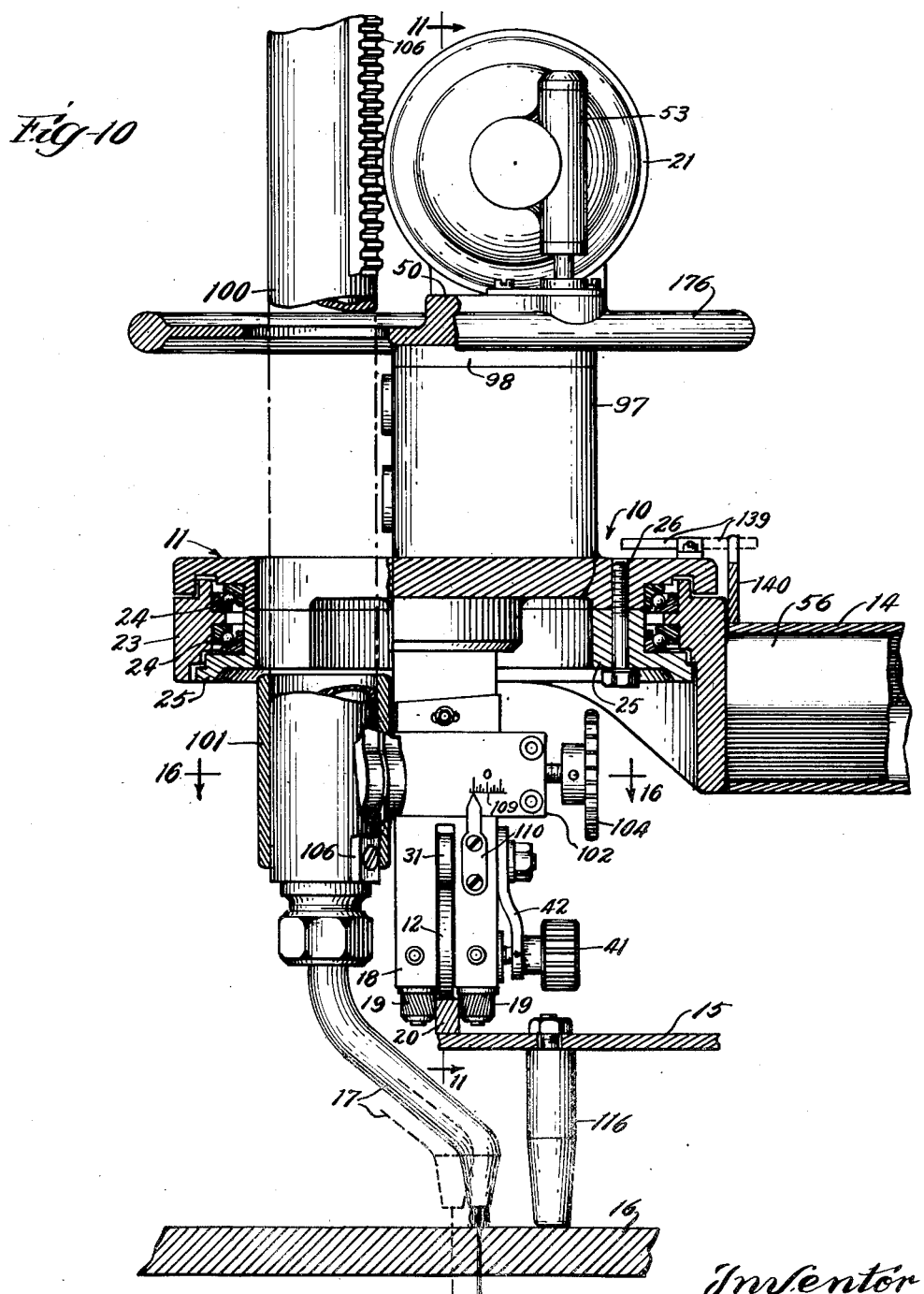

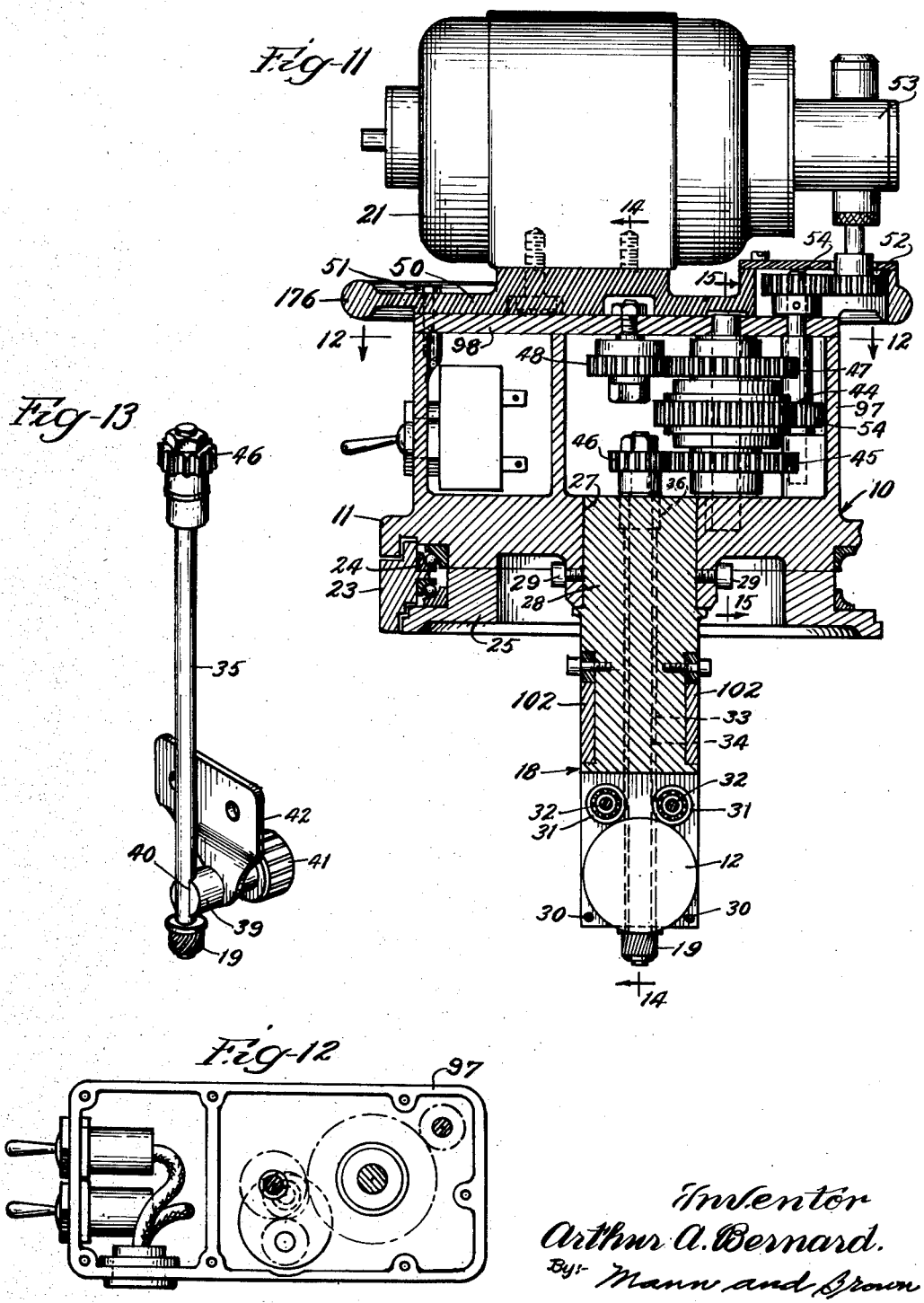

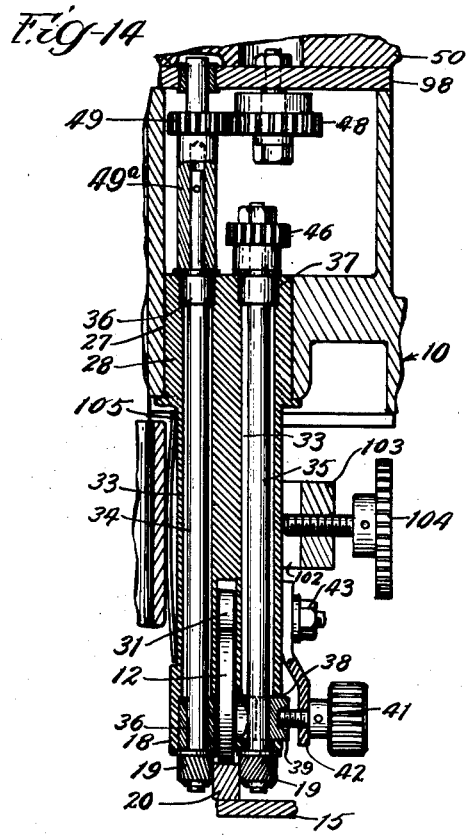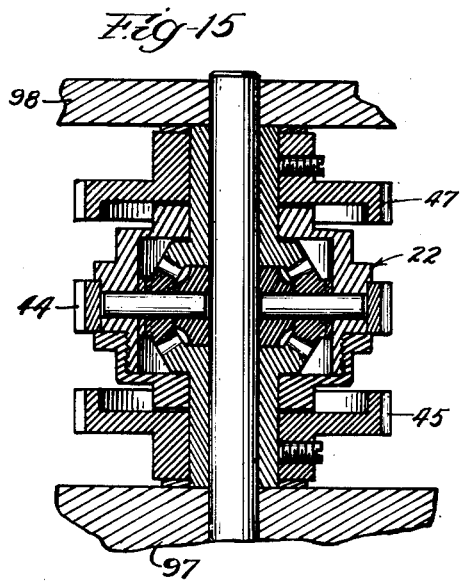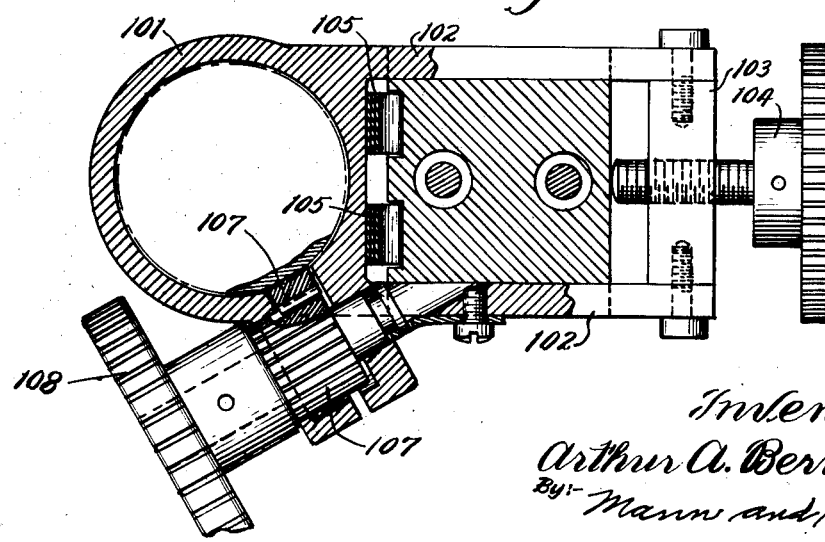

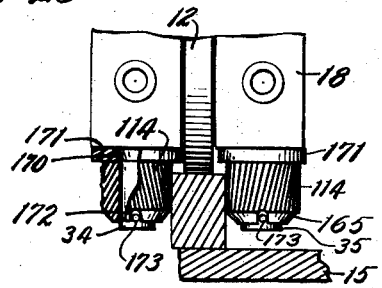
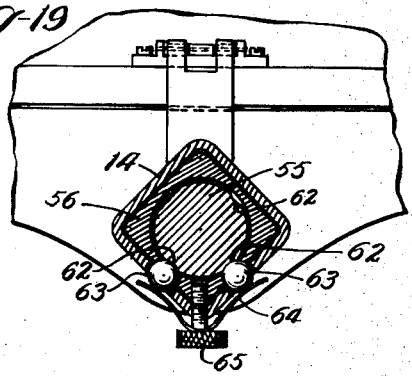
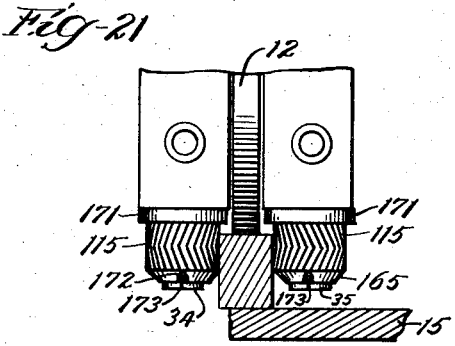
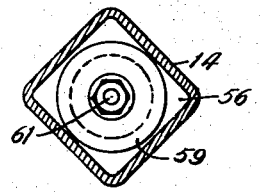
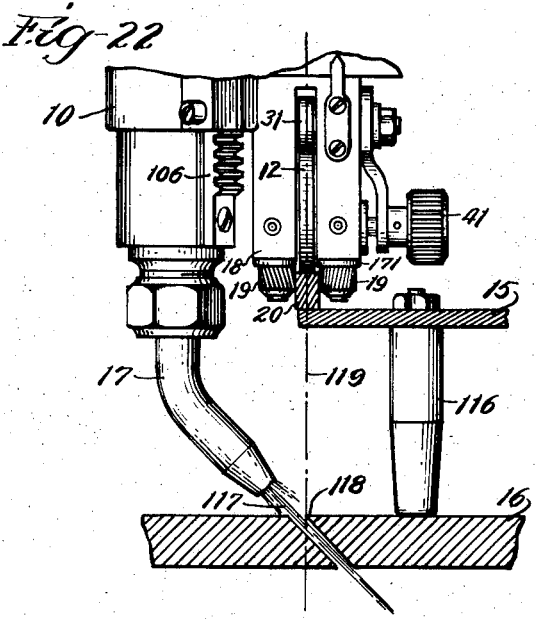
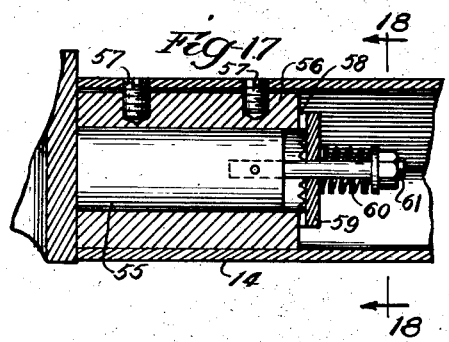

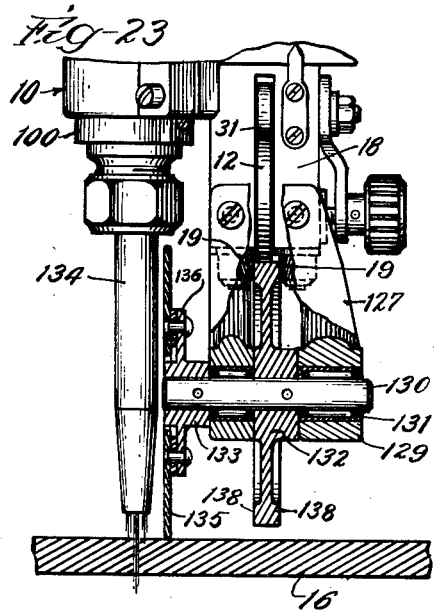
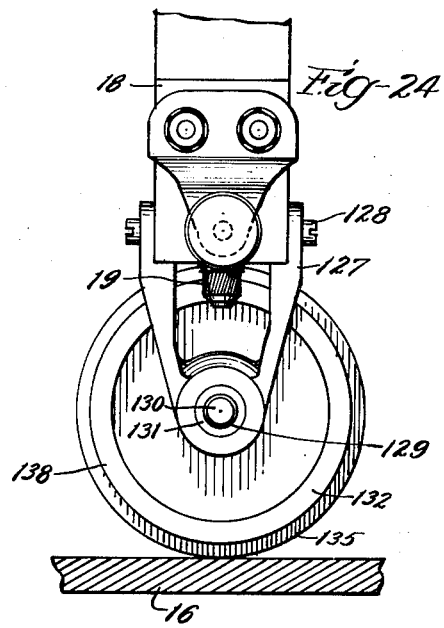
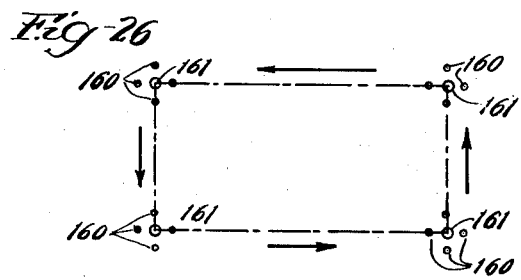
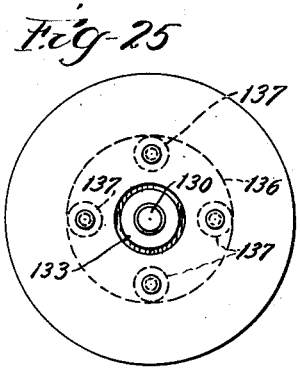
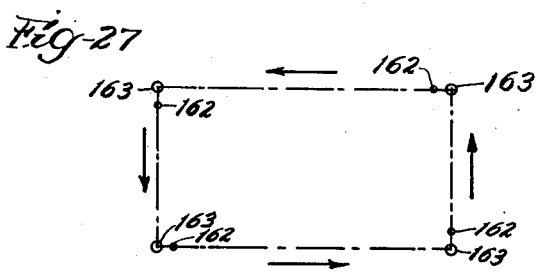
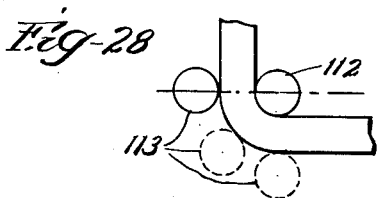

June 17, 1952        A. A. BERNARD        2,600,728
SHAPE-CUTTING MACHINE OR THE LIKE
Filed Oct. 14, 1947        13 Sheets-Sheet 11
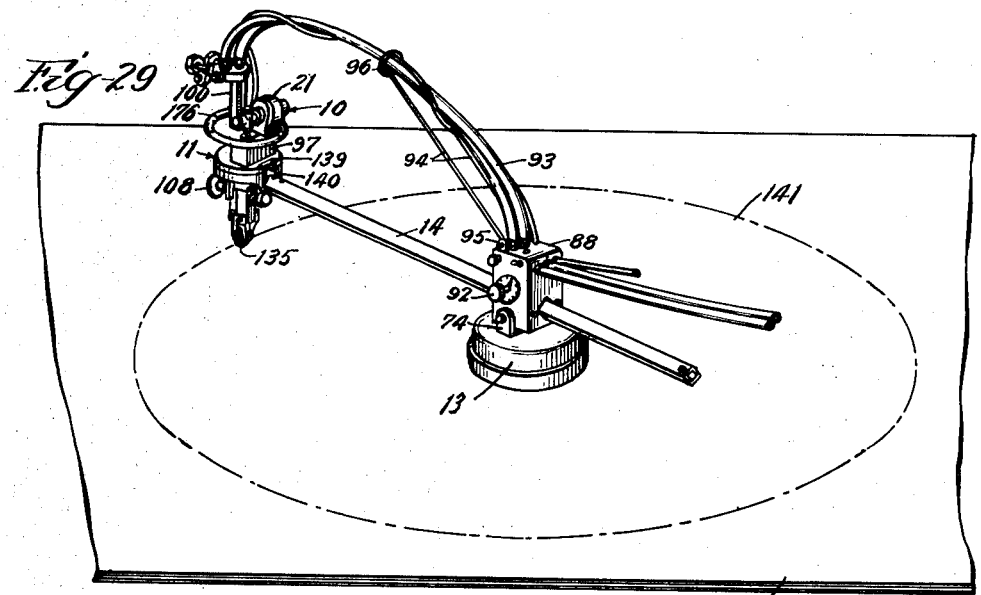

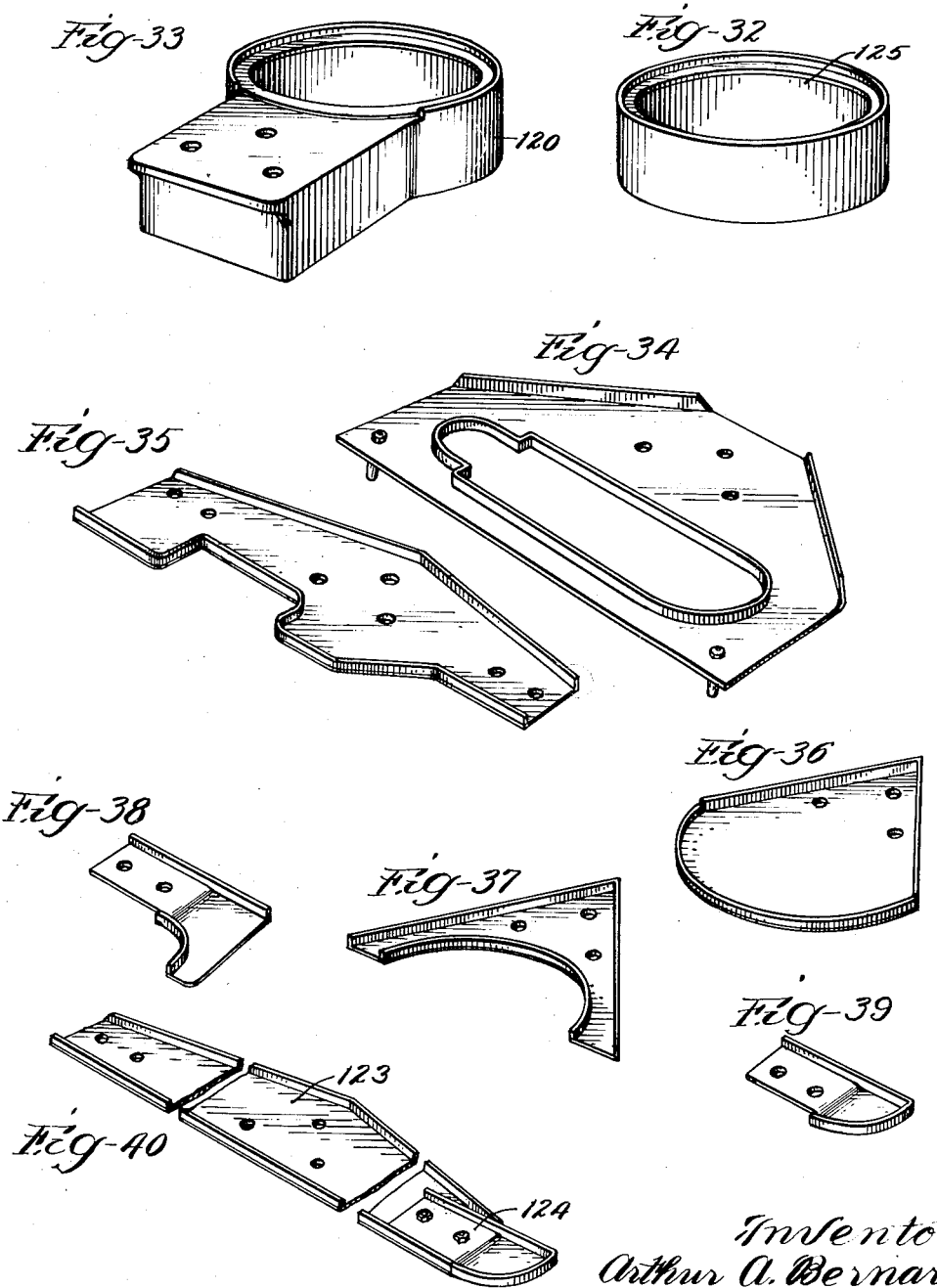

June 17, 1952        A. A. BERNARD        2,600,728
SHAPE-CUTTING MACHINE OR THE LIKE
Filed Oct. 14, 1947        13 Sheets-Sheet 13
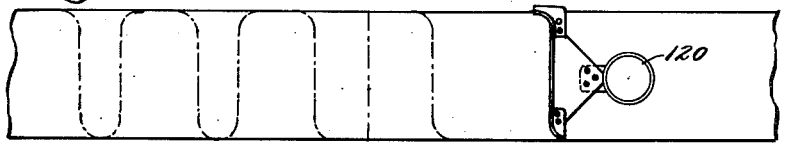
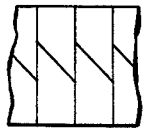 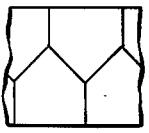 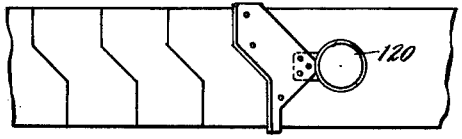
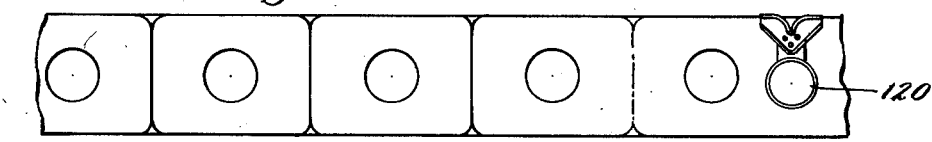
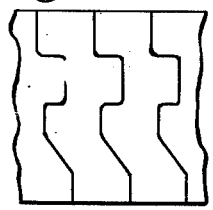 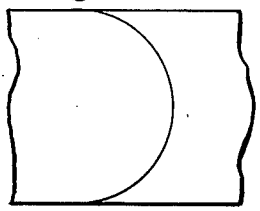 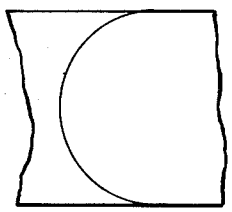
Inventor
Arthur A. Bernard
By:- Mann and Brown
Attys.

Patented June 17, 1952

2,600,728

UNITED STATES PATENT OFFICE 2,600,728

SHAPE-CUTTING MACHINE OR THE LIKE

Arthur A. Bernard, Chicago, Ill.

Application October 14, 1947, Serial No. 779,711

25 Claims. (Cl. 33—27)

The principal object of this invention is to provide a light, portable, low-cost, all-purpose shape-cutting machine for operating a cutting torch on a work piece that will:

1. Automatically orient the torch constantly with respect to the line of travel or the line to be cut, whether straight or curved;
2. Do bevel cutting simultaneously with irregular shape cutting;
3. Follow a complex templet accurately and regardless of size;
4. Cut larger or smaller than a templet (plus or minus the templet);
5. Cut square corners;
6. Cut small, intricate curves;
7. Cut large and small circles without a templet; and
8. Work in any position from horizontal to vertical, together with a lot of other features, some of which will be specifically discussed.

Generally speaking, this is accomplished by providing a tracing head or carriage including a turntable or single castor that is rotatable through 360 degrees about its own axis and about a portable stabilizing base with respect to which it is otherwise freely movable back and forth through a selected distance and which is propelled by a pair of differentially driven traction rollers astride the axis of rotation of the turntable which grip the guide rail of a templet to propel the tracing head or carriage along and hold the torch at a constant distance above the work and constantly orient it with respect to the line of travel or the line to be cut.

Further objects and advantages of the invention will appear as the disclosure proceeds.

The preferred embodiment of the invention, which has been found practical, is shown in the accompanying drawings, in which:

Fig. 1 is a perspective view of the machine on a templet which will normally be resting upon a work piece or secured to a work piece to be cut;

Fig. 2 is a side elevation, partly in section, of the machine secured to a templet, which, in turn, is secured to a work piece—in this instance, in upright or in vertical position;

Fig. 3 is a side elevation of the machine resting on a templet, which, in turn, is resting on a work piece to be cut;

Fig. 4 is a similar side elevation of the machine associated with an auxiliary base and a small templet secured to the base, all of which are resting on a work piece to be cut;

Fig. 5 is a side elevation of the machine on a familiar type of pedestal adjacent to a work table supporting a work piece and a templet;

Fig. 10 is an enlarged elevation partly in section of the tracing head or carriage and the swivel ring in which the turntable is mounted;

Fig. 11 is a vertical section taken on the line 11—11 of Fig. 10;

Fig. 12 is a transverse section taken on the line 12—12 of Fig. 11;

Fig. 13 is a perspective view of one of the traction rollers and its driving shaft together with the adjustment by which it is made to grip the guiding rail of a templet or the endless track of an attachment;

Fig. 14 is a vertical section taken on the line 14—14 of Fig. 11;

Fig. 15 is a vertical section on the line 15—15 of Fig. 11;

Fig. 16 is a transverse section taken on the line 16—16 of Fig. 10;

Fig. 17 is an enlarged fragment showing one way of swiveling the tracing head or carriage on the stabilizing bar;

Fig. 18 is a cross section on the line 18—18 of Fig. 17;

Fig. 19 is a similar cross section of a modified form;

Fig. 20 is an enlarged detail showing the traction rollers with inclined or curved driving ribs;

Fig. 21 is a similar view showing the traction rollers with herringbone driving ribs;

Fig. 22 is an enlarged detail showing the arrangement of the torch for bevel cutting;

Fig. 23 is an enlarged elevation, partly in section, showing the carriage equipped with an attachment enabling it to be power driven without the aid of a guiding rail on the templet, or manually guided for free-hand cutting;

Fig. 24 is a side elevation of the same;

Fig. 25 is a side elevation of a heat resisting wheel used in the attachment shown in Figs. 23 and 24 for running close to the cutting torch;

Fig. 26 is a diagram showing the conventional practice of using preheating flames arranged about a cutting jet;

Fig. 27 is a similar diagram showing how a single preheating torch performs the work of several in prior practice due to the automatic orientation afforded by this invention;

Fig. 28 is a diagram illustrating the manner in which the differentially driven traction rollers traverse a sharp bend in the guiding rail of the templet;

Fig. 29 is a perspective view showing the machine as arranged for cutting a large circle;

Fig. 30 is a similar perspective view showing the machine rigged to cut a small circle;

Fig. 31 is a perspective view of an attachment used in cutting small circles as illustrated in Fig. 30;

Fig. 32 is an auxiliary base or adapter used under the normal base of the machine in operations illustrated by Figs. 23, 24, 29, and 30;

Fig. 33 is a perspective view of an auxiliary base for under the machine in connection with a small templet in the arrangement illustrated in Fig. 4;

Figure 6:
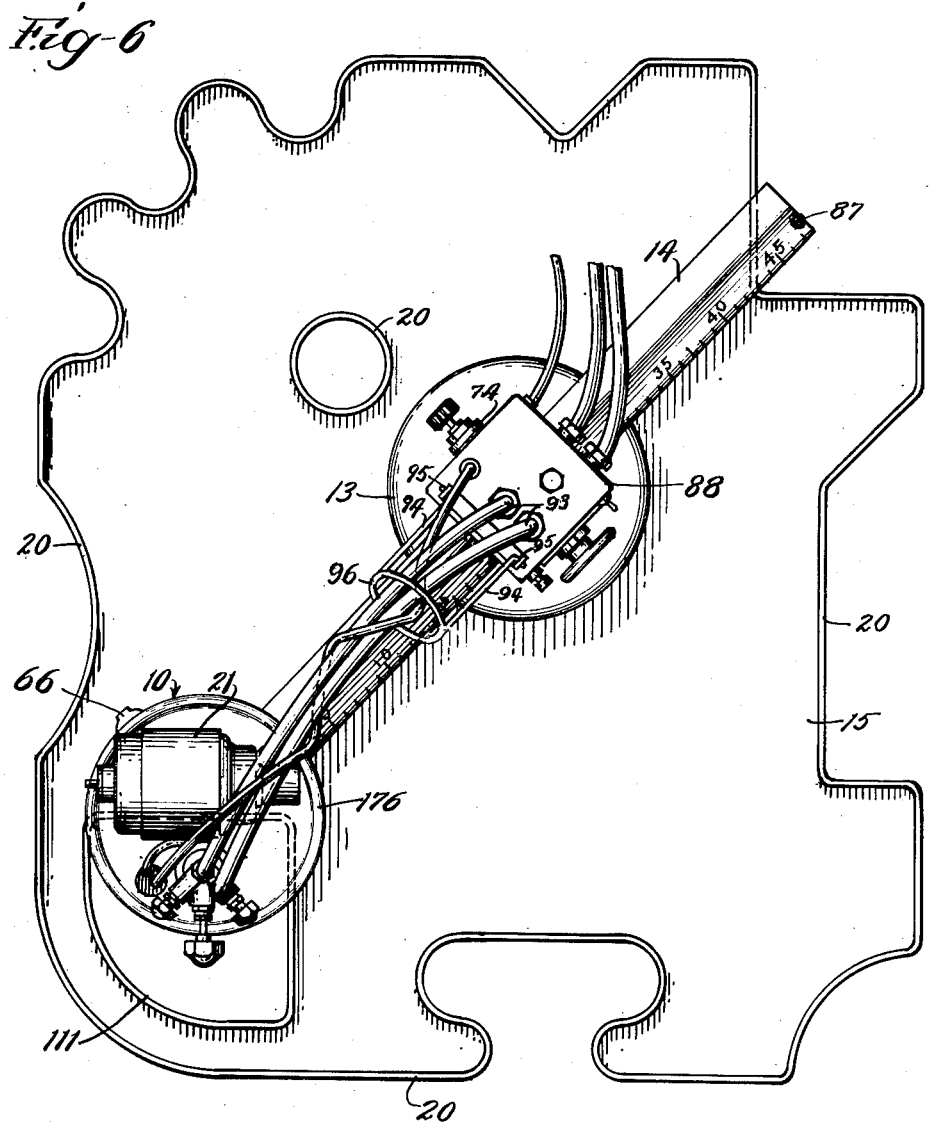
Fig. 6 is a plan view showing the machine on a complex templet in which are included all of the common curves, angles, and inclines at the outside and a circle and some additional figures on the inside.

Figs. 34, 35, 36, 37, 38, 39, and 40 are perspective views of different forms of templets and templet attachments for use with the machine and the auxiliary base;

Figs. 41, 42, 43, 44, 45, 46, 47, and 48 are plan views illustrating the use of an auxiliary base and a small templet in cutting simple figures from a plate.

But these drawings and the specific description are used for the purpose of disclosure only, and are not intended to impose unnecessary limitations on the claims.

*General Description*

In the preferred embodiment of the invention, there is a tracing head or carriage 10 (Figs. 1, 2, 3, 10, and 11) including a turntable 11 (Figs. 10 and 11) rotatable through 360 degrees and supported by a single non-driven wheel 12 through which the axis of the turntable passes so that the carriage can travel and swivel like a single castor.

It is maintained in upright position with respect to the work piece by a portable stabilizing base 13 (Figs. 1, 2, 3, 4, and 5) and an arm 14 that is swiveled to both the turntable and the base and slidable with respect to the base.

This arrangement allows the carriage to revolve about and completely around the base and to approach it and to recede from it and (when the limit of the sliding movement of the bar is exceeded) to move the base and simultaneously revolve about it. The carriage may be said to have universal movement with respect to a templet 15 (Figs. 1, 2, and 3) or a work piece 16 (Fig. 4) on which the base is supported, or to a plane parallel to a work piece.

From this, it will be apparent that a cutting torch 17 carried by the carriage will have universal freedom of movement with respect to the work while being held at a predetermined distance from it and maintained in the appropriate position with respect to the line of travel or the line to be cut. And because of the single-castor freedom of the carriage, it can follow the guide rail of a templet through any configuration as an inside rail or an outside rail.

*The tracing head or carriage* (Figs. 10 and 11)

The purpose of the tracing head or carriage is to carry and direct the torch 17, or other suitable tool; and, to that end, it is equipped with or includes a driving head 18 having traction rollers 19 adapted to grip a guiding rail 20 of a templet or the like to propel the head or carriage. It also has a motor 21 for driving the traction rollers 19 through special transmission gearing 22.

The turntable 11, which is the intermediate or body portion of the carriage, is disk-like in form, and is swiveled to a turntable ring 23 by ball bearings 24 and a flanged ring 25 made fast to the under side of the table by bolts 26. The ring 23 is connected to one end of the arm 14 by means permitting the entire head to be swung about the axis of the arm to a position of rest on the side of the ring, or to present the torch nozzle for cleaning or changing.

The turntable has a vertical central bore or socket 27 to receive a cylindrical shank 28 on the upper portion of the driving head 18, which is made fast by set screws 29, thereby making the driving head readily detachable from the carriage.

*The driving head* (Figs. 10, 11, 13, and 14)

The driving head is an oblong, rectangular piece forked at its lower end to receive the supporting wheel 12, which is held in place by pins 30 below and ball bearing races 31 above, the latter serving to support the driving head and with it the entire carriage on the wheel 12; and, to that end, they are held in place by bearing pins 32 extending across the fork of the driving head.

At each side of the supporting wheel 12, the driving head has a longitudinal bore 33 to receive the shafts 34 and 35 of the traction rollers 19. The shaft 34 is journalled on two Torrington needle bearings 36, and the shaft 35 is journalled at its upper end on a single Torrington needle bearing 37, the lower end being journalled in a half bearing capable of being adjusted in order to regulate the space between the traction rollers 19 and provide appropriate gripping action on the guiding rail of the templet or the endless wheel of another attachment.

This arrangement is best shown in Figs. 13 and 14, where it will appear that the lower end of the driving head has a lateral bore 38 receiving a cylindrical bearing 39 having a semi-circular bearing seat 40 for the lower end of the shaft 35. The bearing 39 is controlled by a thumb screw 41 threaded through a spring bracket 42 made fast to the side of the driving head by bolts 43. The spring bracket 42 is designed with appropriate resiliency to give the correct pressure on the lower end of the shaft 38 at the right in Fig. 14 to insure the driving grip on the guiding rail 20, or other guiding expedients. The pressure is adjusted by simply turning the adjusting screw 41 in the appropriate direction. The spring 42 will allow for and accommodate irregularities in the thickness of the rail, some of which are unavoidable in bending guiding rails in the conventional manner.

*The driving gear*

In order to insure some of the important advantages of this invention, the traction rollers 19 must be differentially driven; and, in order to serve economy and make it possible to bring the traction rollers close together, the arrangement of the differential gearing is of special importance. Heretofore, as in my prior application Ser. No. 580,225, filed February 28, 1945, the differential was arranged with its axis at right angles to the driving shafts for the traction rollers. This made it necessary to build special gears at high cost, and, in addition, made it impossible to place the traction rollers as close together as is often desirable in many uses of the machine. According to the present invention, the transmission gearing, generally indicated at 22, includes differential gearing with its axis substantially vertical or parallel to the axes of the shafts 34 and 35. This brings the ring gear 44 in a horizontal position with its axis at one side of the axis of the turntable, which is between the axis of the shafts 34 and 35 and passes through the supporting wheel 12. By this means, one of the driving gears 45 drives a pinion 46 on the upper end of the shaft 35, and the other driving gear 47 drives an idler 48, which, in turn, drives a pinion 49 in driving connection with the shaft 34 through the spacer 49a.

All of this gearing is assembled within the gear casing 97, somewhat rectangular in form, on top of the turntable 11, and closed by a cover plate 98 on which the motor base 50 rests, and both of which are secured to the gear casing 97 by bolts 51. The arrangement of the gearings and their bearings within the casing and the cover will be clear from an inspection of Figs. 11, 12, and 14 without specific description.

It will be sufficient to say that the motor 21 drives a pinion 52 through worm gearing 53, and the pinion 52 drives the ring gear 44 through gearing generally indicated by 54.

This arrangement of the differential makes it possible to fit each machine with an assortment of driving heads having different spacing of traction rollers 19, thereby making a single machine suited to a variety of different classes of work and a variety of templet guiding rails.

*Idle position of the tracing head and carriage*

When the machine is not in use, the carriage should be in a position to protect its various parts from injury, and particularly the cutting tip. To that end, the swivel ring 23 is provided with a cylindrical shank 55 (Figs. 17 and 18) rotatably mounted in the plug 56 and secured in the adjacent end of the arm 14 by screws 57. The inner end of that plug is provided with ratchet teeth 58 to cooperate with a pawl 59 urged toward the teeth by springs 60 on a bolt 61 secured to the shank 55.

An alternative form of such mounting is shown in Fig. 19, in which the shank 55 is provided with spherical seats 62 to cooperate with balls 63 urged inwardly by a spring 64 compressed by a screw 65 threaded into the plug 56. This arrangement permits the tracing head and carriage to be turned through 90 degrees to a position of rest when it is out of use, or when the cutting tip is to be cleaned or changed, and readily returned to upright position for use afterwards. As indicated in Fig. 6, the side of the swivel ring 23 may be provided with a special tooth 66 on which the carriage end of the apparatus may rest.

*The base*

The base, generally indicated by 13, is an inverted, cup-like casting 67 having a central hub 68 threaded at 69 to receive fastening bolts when it is to be made fast as indicated by the bolts 70 in Fig. 2.

Figure 7:
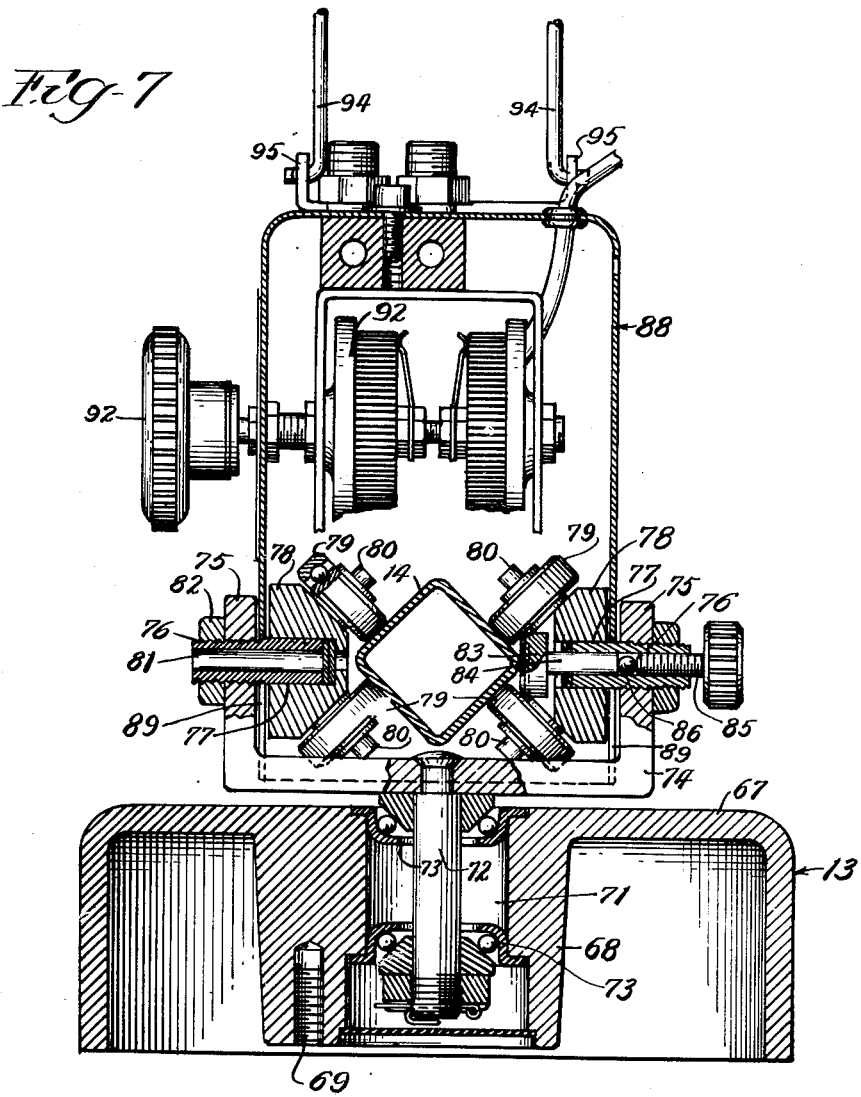
Fig. 7 is an enlarged sectional view on the line 7—7 of Fig. 3.
Figure 8:
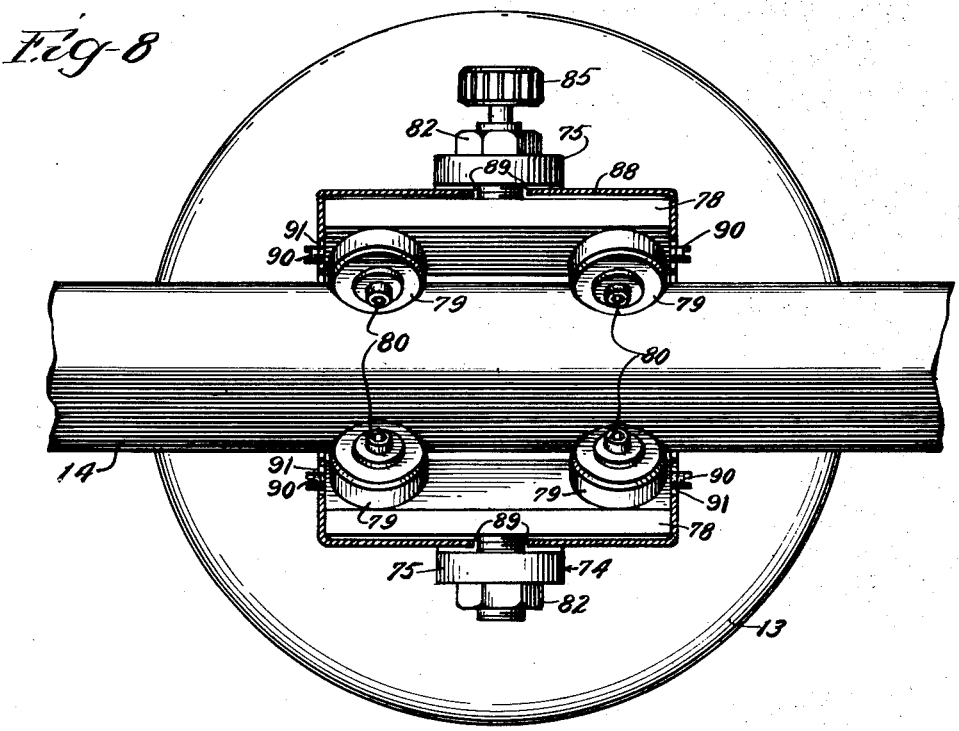
Fig. 8 is another enlarged sectional view taken on the line 8—8 of Fig. 3.
Figure 9:
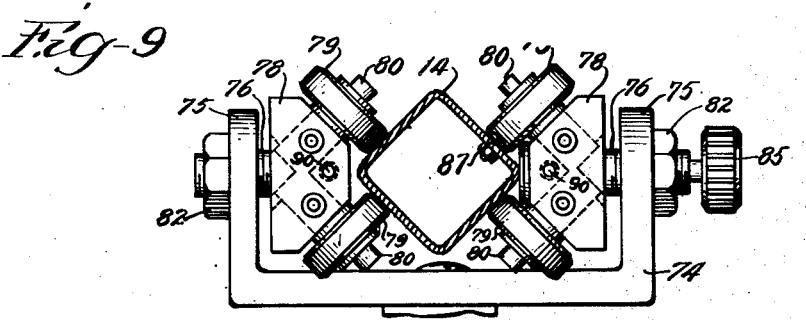
Fig. 9 is a transverse section across the stabilizing bar looking toward the left in Fig. 8 with the control cabinet removed.

The hub has a central bore 71 in which a pintle 72 is journalled on ball bearings 73. The upper end of the pintle carries a device sometimes referred to as a bracket, and which includes a forked head 74, the arms 75 of which receive screw threaded trunnions 76 entering sockets 77 in bars 78 (Figs. 7, 8, and 9) which serve as bases for two sets of New Departure ball bearing rollers 79 on pintles 80. Those sets of ball bearing rollers form a passageway in which the arm 14 may slide as the carriage moves to and from the base 13.

Each of the trunnions 76 has a kerf 81 by which it may be adjusted to regulate the pressure of the ball bearing rollers 79 on the arm 14, and the adjusted pressure may be maintained by setting up the lock nuts 82.

The arm is here shown as square, seamless steel tubing, which has considerable resiliency, by virtue of which the two sets of four bearings each may be set up with considerable pressure while permitting the arm to be moved back and forth with a minimum of resistance. This contributes to the steadiness and stability of the machine.

In order to fix the effective length of the arm 14, there is provided a positive stop including a plug 83 having a shank 84 movable in one of the trunnions 76 and subject to pressure of an adjusting screw 85 on a ball 86.

It is contemplated that the length of the arm 14 will be made or extended to suit any particular conditions for use of the machine, and that there shall be a stop to prevent the arm from becoming inadvertently disengaged from the base. The arm can even be made in assorted lengths or in several pieces that may be readily secured together or taken apart. As a permanent limit to the movement of the arm away from the base, a round head screw 87 (Figs. 6 and 9) is inserted through the end of the arm in the path of one of the ball bearing rollers 79.

*The control cabinet*

A control cabinet 88, consisting of a sheet metal box, is mounted on the base by slitting its sides at 89 to receive the trunnions 76, and it is made fast by screws 90 inserted into the ends of the bars 78 through elongated slots 91, which permit the adjustments provided for without distorting the control cabinet.

In the control cabinet is mounted a control switch 92 in the form of a rheostat by which the speed of the motor 21 may be controlled and varied to suit the conditions and requirements of the particular work.

The control cabinet also forms a convenient place for connecting hose 93 which supply the gases to the cutting torch.

In the position that is shown in the drawing, the hose are generally self supporting, but in other positions as the carriage approaches the base 13 there is a tendency for them to droop to the side, and to prevent this there is provided a support consisting of side arms 94 hinged at 95 and bearing at their outer ends a loop 96 extending around the hose and the wiring leading from the control cabinet to the motor.

*The mounting of the torch*

The torch body 100 is mounted on the carriage for both vertical and lateral adjustment to permit the space between the cutting tip and the work piece to be varied and to vary the location of the tip with respect to the central axis of the turntable. To this end, the torch body is passed through a circular barrel 101 having arms 102 astride the driving head 18 (Figs. 10 and 16) and having their free ends secured to a nut 103 for an adjusting screw 104. A bent spring 105 between the barrel 101 and the driving head tends to shift the barrel to the left in Figs. 10 and 16, whereas the screw 104 may be adjusted to shift it to the right in opposition to the spring. By this means, the axis of the cutting tip may be set to the right or to the left of the axis of the turntable in Fig. 10 and thus make it cut larger or smaller than a templet, as indicated by the guide rail 20—in the language of the trade, plus or minus the templet. It also permits the axis of the cutting tip to be aligned with the axis of one of the traction rollers 19 when a sharp bend is to be rounded, as will be discussed in connection with Fig. 28.

The vertical adjustment is achieved by means of a rack 106 on the upper portion of the torch body cooperating with the pinion 107 (Figs. 10 and 16) controlled by a knob 108.

In order to conveniently indicate a selected adjustment laterally with respect to the axis of the turntable, one of the forks 102 is provided with a scale 109 and the driving head is provided with a pointer 110 directed at the scale. In this way, the adjusting screw 104 becomes in effect a micrometer by which the axis of the torch may be very accurately and quickly set.

General operation

With the machine set up as illustrated on sheets 1, 2, and 3 of the drawings, the preheating flames are lit and adjusted. When the preheat brings the surface of the work piece to the proper temperature, the high pressure oxygen valve is opened, and the motor 21 is started.

The adjusting screw 41 having been set to provide the appropriate pressure of the traction rollers 19 on the guide rail 20 of the templet, the rollers will propel the carriage along the rail on the supporting wheel 12.

The grip of the traction rollers 19 on the rail makes the carriage take and maintain a position on a line between the axes of the two rollers 19 at right angles to the axis of the rail of the templet, whether that be a straight line or on a curve. When it is a straight line, the axes of the traction rollers are on a line at right angles to it. When it is on a curve, they are on a line at right angles to the tangent to the curve between the rollers.

This automatically turns the carriage about the axis of the turntable and maintains the cutting jet in proper relation to the line of travel or the line to be cut, whether straight or curved. For want of a better term, this is called orientation.

Due to the differential drive for the rollers 19, this orientation is preserved through any complex templet rail without regard to size.

Fig. 6 is selected as an example to show the variety of movements through which the traction rollers 19 will take the carriage with perfect orientation with respect to the line to be cut. At the upper left is an illustration of gear teeth. Toward the lower corner from that is a circle indicating the hole for a shaft. Following down the left side, there are a variety of curves, and at the lower side there is a somewhat complex re-entrant cut with curves. Following up the right side are corners and angles of various degrees. All of these are readily followed by this machine.

In this figure, the machine is set to cut an internal complex figure indicated by the rail 111.

Fig. 28 indicates diagrammatically how the differentially driven traction rollers 19 enable the machine to turn sharp curves or even substantially square corners. When one of the driving rollers indicated by the position 112 reaches the crux of the bend, the differential permits it to come to rest, while the other roller in the position 113 speeds up to round the turn, automatically orienting the nozzle as it proceeds and maintaining a fixed speed. In turning a corner in the opposite direction, the reverse would be true.

The inclined ribbed traction rollers

In order to provide appropriate traction between the rollers and the guide rail, they are provided with ribs or a knurled surface; but it is a decided improvement to make the knurling or ribs on an incline or curve, as indicated at 114 in Fig. 20, or after the fashion of what is known as herringbone 115 in Fig. 21. These and other similar forms of inclined ribs or knurling effect a smoothness of rolling contact between the traction rollers and the side of the rail, and eliminate what would otherwise amount to chattering, especially at speeds necessary in cutting heavy sheets.

In addition, by making the incline or curved ribs left and right, the traction rollers grip the rail with a downward pull or a pull toward the templet, pressing the supporting wheel 12 onto the top of the guiding rail and thus maintaining the proper relation between the cutting torch and the work without the necessity of counterbalancing or providing spring pressure. This is of particular importance when the machine is used in a vertical position, or positions approaching that illustrated in Fig. 2.

The templet

The templets shown in Figs. 1–5 are all equipped with legs or supports 116 of uniform length whereby there is provided a uniform space between the edge of the templet and the work in which the torch 17 may be freely adjusted to bring the cutting nozzle to the exact position required for the particular maneuver. Thus, in ordinary cutting along a straight line there is ample room, as shown in Fig. 10, to bring the axis of the torch tip in line with the axis of the turntable; and, where the work is to be cut smaller or larger than the templet, the axis of the tip may be adjusted laterally to suit. Also, in turning sharp curves or producing square corners, the axis of the tip may be brought in line with the axis of the traction roller on the inside of the curve or corner.

Bevel cutting

By reason of the constant orientation of the torch with its high pressure oxygen lance, this machine can do bevel cutting simultaneously with irregular-shape cutting. This is diagrammatically illustrated in Fig. 22, where the lance 117 is shown intersecting the top surface 118 of the work piece at the axis 119 of the carriage and the templet. By adjusting the torch body outwardly or inwardly with respect to the axis 119, the torch may be made to cut plus or minus the templet while bevel cutting simultaneously with irregular-shape cutting.

Simplified preheating

In conventional practice, the torch has a plurality of preheating bores arranged about a central oxygen bore. When cutting irregular figures, or even a simple device like a rectangle, only one of the preheating bores is aligned in advance of the oxygen bore. The others are largely wasted. This is illustrated in Fig. 26, where 160 indicates preheating bores and 161 indicates the oxygen bore.

Contrasted with this, in Fig. 27 a single preheating bore 162 is always in advance of and in line with the oxygen bore 163. That is made possible with this invention because of the constant orientation with respect to the line of travel or the line to be cut.

Beveled traction rollers

The traction rollers 19, 114, and 115 all have their lower corners 165 beveled, whereby they are easily brought into appropriate alignment with the guiding rail and spread apart against the resistance of the spring 42 by merely pressing the carriage downwardly.

The shafts 34 and 35 for the traction rollers are reduced at their lower ends to form a curved shoulder 170, which receives a washer 171 just above the traction rollers, which is notched at 172 to receive a cotter key 173 passing through the end of the respective shaft. This prevents localization of stresses in the area of the shoulder and adds greatly to the life of the shafts.

While the traction rollers may be made of a variety of materials, it has been found satisfactory to use tool steel and harden them 50 to 52 Rockwell C.

Special operation with templet joined to auxiliary base of the machine

There are a great variety of cutting operations from very small pieces or small openings to great ones in which a machine of this invention has special advantages, and perhaps therein lies its greatest usefulness. Instances to illustrate these are to be found in Figs. 4 and 34–48.

As illustrated in Fig. 4, the base 13 is resting upon an auxiliary base 120 to which a templet 121 is secured by bolts 122, the otherwise free end of the templet being equipped with supports 116 of appropriate length. With a machine arranged on such a combination of auxiliary support and templet, the greatest variety of cutting operations, large and small, can be performed. Figs. 34 to 40 give examples of templets that may be assembled with the auxiliary base 120 and form a foundation on which the machine is isolated from surrounding conditions and performs its allotted cutting operations regardless of them. These expedients may be used to do shape cutting on various parts after fabrication, such as locomotive frames, tender frames, car sides, and such like.

Also, these expedients can be used as illustrated in Figs. 41–48 by bolting a suitable templet or templet element to an auxiliary base 120, which forms a unit that may be moved step by step along a sheet bearing the machine and maintaining it in proper operative condition while it repeats the same operation over and over again on the sheet. Figs. 41–44 illustrate selected operations of cutting cross shapes out of elongated sheet. Fig. 45 illustrates operations including round holes and simulated round corners in succession along a sheet which can later be severed by straight cutting or any shearing machine.

Fig. 40 shows a templet 123 for use with the auxiliary base 120, which really amounts to a straight edge, to the ends of which may be fitted a variety of auxiliary templet pieces. A selected end piece with a curve is indicated at 124. The variety of forms of such a combination are deemed too numerous to attempt to illustrate.

Cutting without a templet manually or automatically guided

With appropriate auxiliary attachments, the machine can be used for a great variety of cutting operations without a templet and guided either automatically or manually. Reference is made particularly to Figs. 23, 24, 25, and 29–32.

This sort of cutting is made possible by an auxiliary base 125, shown in Fig. 32, in conjunction with the special driving support shown in Figs. 23–25.

127 indicates a forked pedestal-like bracket secured to the driving head 18 by cap screws 128 and having journal boxes 129 for a shaft 130 on needle bearings 131 and equipped with wheel-like endless track 132. The shaft 130 projects toward the nozzle from the axis of the turntable and outside of the bracket 127 is equipped with a supporting wheel 133 close to the side of the torch tip 134.

With this auxiliary support for the carriage and the auxiliary base 125 (Fig. 32) for the base 13, the machine can do its cutting with manual guidance or automatic guidance. With manual guidance, it is important to have the wheel 133 as close to the tip 134 as possible. In rounding curves or going from a tangent to a curve when it it close, as indicated in Fig. 23, the body portion or web of the wheel 135 should be made of heat resisting material such as chrome nickel steel, and preferably it is riveted to a flange 136 separated from the web by washers 137 of heat insulating material. Thus, the conduction of heat from the web to the body of the wheel is almost entirely through the small number of rivets, and is negligible.

For convenience in guiding the carriage in these manual operations, it is provided with a hand wheel 176, shown in Figs. 10 and 11 as an extension of the base 50 for the motor 21.

For such operations as illustrated in Figs. 29 and 30, the auxiliary support for the carriage is also used to propel it, the traction rollers 19 being adjusted to grip the side faces of the rim 138 of the wheel-like endless track 132. Indeed for this operation the wheel-like endless track might be the support without the aid of the wheel 133.

In this operation, it is convenient, if not necessary, to prevent the rotation of the carriage about the axis of the turntable, and to that end there is provided a latch 139 (Fig. 10) adapted to engage the keeper 140 to lock the turntable against rotary motion. With that latch in position and the apparatus set up as illustrated in Fig. 29, the operation is started as though a templet was being used, the traction rollers 19 driving the endless track or wheel 132 and making it travel in a circle as indicated by 141 (Fig. 29), the adjusting screw 135 having been set up to prevent the arm 14 from moving with respect to the base 13. With this arrangement, large circles of almost any dimension can be rapidly cut.

For small circles, the arrangement shown in Fig. 30 is very satisfactory. In this, there is added to the attachment of Figs. 23 and 24 a device shown in Fig. 31 for confining the movement of the torch to a small circle. This device includes side bars 142, shown as part of a yoke and having their ends 143 attached to the set screws 128. They are adjustably connected with a block 144 by a plate 145 and a screw 146 with a wing nut 147. Connected with the block is an angular bar 149 having a sharp point 150 adapted to be received in a mark made with a center punch at the center of a circle it is sought to cut. In this operation, the adjusting screw 85 will be released in order to allow the arm 14 to slide back and forth in the bracket on the base 13.

In the apparatus as illustrated in Fig. 30, the operation is substantially the same as shape cutting with a templet, except that the traction rollers 19 propel the carriage through the wheel-like track member 132.

This application is a continuation-in-part of my prior application Serial No. 580,225, filed February 28, 1945, now abandoned.

I claim:

1. In a device of the class described, a tracing head, a pair of spaced traction rollers having substantially parallel axes for propelling the head, and means for driving the rollers including differential gearing with its ring gear on an axis substantially parallel to the axes of the traction rollers and spaced laterally from the line joining the axes of said traction rollers and a supporting roller for the head between said traction rollers with its lower periphery above the bottom of the traction rollers.

2. In a device of the class described, a tracin head, a turntable therefor, propelling means for the head including a pair of spaced traction rollers, substantially parallel shafts for the rollers mounted on the turntable, differential gearing mounted on the turntable with the axis of its ring gear substantially parallel to said shafts and spaced laterally from the line joining the axes of said traction rollers, an idler between the differential and one of said shafts, and a non-driven wheel supporting the weight of said tracing head and turntable mounted between said shafts and having its lower periphery above the bottom of said traction rollers.

3. In a device of the class described, a tracing head, a turntable therefor, a pair of spaced traction rollers substantially parallel to the axis of the turntable, a swivel ring for the turntable, an arm substantially at right angles to the axis of the turntable, and a swivel connection between the ring and the arm.

4. In a device of the class described, a tracing head, a turntable therefor, a pair of spaced traction rollers substantially parallel to the axis of the turntable, a swivel ring for the turntable, an arm substantially at right angles to the axis of the turntable, a swivel connection between the ring and the arm, a base, and a slide bracket universally connected with the base and receiving the arm.

5. In a device of the class described, a tracing head, a turntable therefor, a pair of spaced traction rollers substantially parallel to and at each side of the axis of the turntable, a swivel ring for the turntable, an arm substantially at right angles to the axis of the turntable, a swivel connection between the ring and the arm, and means to latch the ring in a selected position.

6. In a device of the class described, a tracing head, and a pair of spaced substantially parallel traction rollers for the head, both of said rollers, having substantially continuous and unbroken oppositely inclined ribs on their traction surfaces, the traction surfaces of said rollers being substantially parallel to each other and to the surface engaged by them, and means for driving the rollers in opposite directions.

7. In a device of the class described, a tracing head, a turntable therefor, means for propelling the tracing head including a motor on the turntable driving through differential gearing a pair of traction rollers astride the axis of the turntable and substantially parallel thereto, and a supporting roller for the head between said traction rollers with its lower periphery above the bottom of the traction rollers.

8. In a device of the class described, a tracing head, a turntable therefor, means for propelling the tracing head including a motor on the turntable driving through differential gearing a pair of traction rollers astride the axis of the turntable and substantially parallel thereto, a supporting roller for the head between said traction rollers with its lower periphery above the bottom of the traction rollers, and anti-friction bearings between the head and the periphery of said supporting roller.

9. In a device of the class described, a base, a templet connected with the base and having a guiding rail thereon, a slide bracket mounted on the base for limited universal movement, a guiding arm sliding in the bracket, a turntable connected with one end portion of arm, a tracing head mounting the turntable, and a pair of traction rollers for the head cooperating with the guiding rail on the templet.

10. In a device of the class described, a portable base, an arm mounted on the base to slide and to rotate through 360 degrees with respect to the base, a carriage including an annular bearing swiveled to one end of the arm, a turntable supported by said bearing to rotate through 360 degrees therein, a tool mounted on the turntable and movable therewith, a wheel supporting the carriage on the axis of the turntable, and a pair of driven traction rollers, one at each side of said wheel and said axis and parallel to said axis.

11. In a device of the class described, a portable base, an arm mounted on the base for limited movement crosswise to and for rotation about the axis of the base, a carriage including an annular bearing swiveled to the arm, a turntable supported by said bearing to rotate about an axis substantially parallel to the first mentioned axis, a tool mounted on said turntable and extending through said bearing and movable with said carriage, and a pair of driven traction rollers to propel said carriage along a guiding track, one of said rollers being at each side of the axis of the turntable and both of said rollers being parallel to said axis.

12. A device as claimed in claim 11 in which the weight of the carriage is supported at the axis of the turntable by a single wheel mounted between the traction rollers, and in which the carriage is stabilized laterally by the arm and base.

13. In a device of the class described, a tracing head, a turntable therefor, a gear casing mounted on the turntable, propelling means for the head including a pair of spaced traction rollers, and a supporting roller for the head between said traction rollers with its lower periphery above the bottom of the traction rollers, substantially parallel shafts for the rollers having their upper ends extending into the gear casing, differential gearing mounted in the casing including a ring gear having its axis parallel to said shafts and spaced laterally from the line joining the axes of the traction rollers, said gearing also including differentially driven, coaxial, vertically spaced spur gears, and means for driving said shafts from said spur gears including spur pinions on said upper ends of the shafts and an idler interposed between one of said spur gears and the pinioned shaft which it drives.

14. In a device of the class described, a tracing head adapted to ride upon and be guided by a templet rail, a pair of differentially and oppositely driven, spaced traction rollers for gripping opposite sides of the rail to drive the head along the rail, a supporting wheel between the rollers adapted to ride upon the top of the rail and support the weight of the head, and substantially continuous ribs on the traction surface of at least one of the rollers, said ribs being inclined in a direction to exert a downward pressure on the supporting wheel.

15. In a device of the class described, a base, an arm mounted on the base for longitudinal movement relative thereto and pivoted for rotation through at least 360° about said base, a carriage mounted at one end of the arm with its weight carried on a single wheel and stabilized laterally by said arm and base, said carriage comprising a relatively large annular bearing, a turntable rotatably mounted in the bearing for rotation through 360°, a tool extending through the bearing and carried by the turntable, and a power-driven traction device for moving the carriage about the base on said wheel.

16. In a device of the class described, a base, an arm mounted on the base for longitudinal movement relative thereto, a carriage mounted at one end of the arm with its weight carried on a single wheel, said carriage comprising a relatively large annular bearing, a turntable rotatably mounted in the bearing for rotation through 360°, a tool extending through the bearing and carried by the turntable, a power-driven traction device for moving the carriage about the base on said wheel, and micrometer means for adjusting the position of the tool relative to the axis of the turntable.

17. In a device of the class described, a tracing head, means for driving the head including a pair of spaced, substantially parallel differentially driven shafts having a pair of traction rollers fixed to the ends thereof, and resilient means for adjusting the alignment of one of the shafts with respect to the other, and hence the distance between the traction rollers.

18. In a device of the class described, a portable base, an arm mounted on the base to slide and to rotate through 360° with respect to the base, a carriage including a turntable swiveled to the arm to rotate through 360°, a tool mounted on the turntable and movable therewith, a wheel supporting the carriage on the axis of the turntable, and a swivel connection between the carriage and the arm whereby the carriage may be rotated about the longitudinal axis of the arm.

19. A device of the character described for processing a workpiece having a relatively plane face, a tool for performing said processing operation, a turntable positioned parallel to said face and having means to support and carry said tool thereon whereby said tool will respond to all movements of said turntable, means affixed to said turntable to support and move said turntable relative to said workpiece, a bearing portion in which said turntable is journaled, an arm attached to said bearing portion, a base, and an arm-bearing means attached to said base to support the arm and to permit longitudinal movement of the arm with respect to said base about an axis substantially normal to said face and being limitedly rotatable with respect to said base about an axis substantially parallel to said plane face.

20. A device of the character described for processing a workpiece having a relatively plane face, a tool for performing said processing operation, a turntable positioned parallel to said face and having means to support and carry said tool thereon whereby said tool will respond to all movements of said turntable, means affixed to said turntable to support and move said turntable relative to said workpiece, a bearing portion in which said turntable is journaled and through which said tool extends, an arm attached to said bearing portion, a base, an arm-bearing means attached to said base to support the arm and to permit longitudinal movement of the arm with respect to said base about an axis substantially normal to said face and being limitedly rotatable with respect to said base about an axis substantially parallel to said plane face, and means to urge said turntable in a direction toward said face.

21. In a shape-cutting machine, the combination of a self-propelled carriage adapted to follow a templet track and having a tracing head provided with power-driven, horizontally spaced, traction means including oppositely driven traction rollers engaging opposite sides of said track, tool means mounted on the carriage for movement therewith with its work-processing end positioned substantially in the vertical plane through the axes of the traction rollers, a relatively limited load-carrying surface on the head upon which the weight of the carriage is at least partially carried and being inadequate in area to give the carriage vertical stability, at least a portion of said load-carrying surface lying in said vertical plane, an annular vertical bearing in which the carriage is journaled and through which the tool means passes so constructed and arranged that the carriage with its tool means may freely rotate within the bearing through an angle of at least 360 degrees, and lateral stabilizing means for maintaining the carriage in upright position, said stabilizing means including a base and an arm secured to said bearing and movable about the axis of the base.

22. In a shape-cutting machine, the combination of a self-propelled carriage adapted to follow a templet track having a tracing head provided with power-driven, horizontally spaced, traction means including oppositely driven traction rollers engaging opposite sides of said track, a tool mounted on the carriage for movement therewith with its work-processing end positioned substantially in the vertical plane through the axes of the traction rollers, a relatively limited load-carrying surface on the head upon which the weight of the carriage is at least partially carried and being inadequate in area to give the carriage vertical stability, at least a portion of said load-carrying surface lying in said vertical plane, a vertical bearing in which the carriage is journaled so constructed and arranged that the carriage with its tool may freely rotate within the bearing through an angle of at least 360 degrees, said bearing having its axis substantially midway between the axes of the traction rollers, and lateral stabilizing means for maintaining the carriage in upright position, said stabilizing means including a base and an arm secured to said bearing and movable about the vertical axis of the base, said base having a horizontal pivot about which said arm may move.

23. In a device of the class described, a base, an arm mounted on the base for movement about the vertical axis of the base, an annular bearing carried at one end of the arm, a turntable supported by the bearing and freely rotatable through 360 degrees within the bearing, means including oppositely-driven, horizontally spaced, traction rollers on the turntable adapted to engage opposite sides of a templet track to guide the movement of the turntable about the base and within the bearing, and tool means carried by the turntable and extending through the annular bearing.

24. A device as claimed in claim 23 in which the arm is mounted on the base for sliding movement with respect to the base.

25. A device as claimed in claim 23 in which the arm is mounted on the base for sliding movement with respect to the base and which is provided with means to limit the same sliding movement of said arm.

ARTHUR A. BERNARD.

REFERENCES CITED

The following references are of record in the file of this patent:

UNITED STATES PATENTS

| Number | Name | Date |
|---|---|---|
| 1,176,584 | Madgett | Mar. 21, 1916 |
| 1,324,005 | Bucknam | Dec. 2, 1919 |
| 1,396,993 | Carter | Nov. 15, 1921 |
| 1,759,857 | Krebs | May 27, 1930 |
| 1,763,793 | Krebs | June 17, 1930 |
| 1,861,758 | Shippy | June 7, 1932 |
| 1,948,952 | Wallerius | Feb. 27, 1934 |
| 1,959,650 | Verity | May 22, 1934 |
| 1,978,042 | Dodge | Oct. 23, 1934 |
| 2,017,429 | Anderson | Oct. 15, 1935 |
| 2,017,430 | Anderson | Oct. 15, 1935 |
| 2,062,157 | Benshimol | Nov. 24, 1936 |
| 2,068,166 | Dodge | Jan. 19, 1937 |
| 2,130,374 | Anderson | Sept. 20, 1938 |
| 2,265,287 | Johnson | Dec. 9, 1941 |
| 2,279,338 | Oldham | Apr. 14, 1942 |
| 2,312,804 | Derrick | Mar. 2, 1943 |
| 2,317,526 | Hayes | Apr. 27, 1943 |
| 2,371,048 | Hayes | Mar. 6, 1945 |
| 2,388,376 | Young | Nov. 6, 1945 |
| 2,394,775 | Hilstrom | Feb. 12, 1946 |
| 2,417,511 | Mott et al. | Mar. 18, 1947 |

FOREIGN PATENTS

| Number | Country | Date |
|---|---|---|
| 30,494 (Addition to 563,969) | France | July 17, 1926 |
| 230,571 | Great Britain | Mar. 19, 1925 |
| 451,616 | Great Britain | Aug. 10, 1936 |
| 454,018 | Great Britain | Sept. 22, 1936 |
| 522,950 | Germany | Apr. 17, 1931 |
| 559,297 | Germany | Sept. 17, 1932 |
| 573,656 | Germany | Apr. 4, 1933 |